United States Patent [19]

McAninch et al.

[11] Patent Number: 4,744,904

[45] Date of Patent: May 17, 1988

[54] WASTE WATER TREATMENT

[75] Inventors: Terry L. McAninch, Westminster; Rodney D. Cooke, Loveland, both of Colo.

[73] Assignee: Birko Corporation, Westminster, Colo.

[21] Appl. No.: 850,580

[22] Filed: Apr. 11, 1986

[51] Int. Cl.$^4$ .............................................. C02F 1/54
[52] U.S. Cl. .................................. 210/632; 210/705; 210/708; 210/725; 210/727; 210/905; 260/412.5; 260/414
[58] Field of Search ............... 210/632, 705, 708, 724, 210/725-727, 728, 905; 260/412.5, 412.7, 414, 417, 418, 425; 530/420, 859

[56] References Cited

U.S. PATENT DOCUMENTS

| | | | |
|---|---|---|---|
| 2,204,703 | 6/1940 | Sanders et al. | 210/724 |
| 2,637,737 | 5/1953 | Gibbs | 260/412.5 |
| 2,708,630 | 5/1955 | Davis | 210/724 |
| 3,056,819 | 10/1962 | Tanabe | 260/414 |
| 3,676,334 | 7/1972 | Zockerman et al. | 210/905 |
| 3,707,464 | 12/1972 | Burns et al. | 210/705 |
| 3,951,795 | 4/1976 | Doncer et al. | 210/724 |
| 4,061,568 | 12/1977 | Hall | 210/705 |
| 4,436,624 | 3/1984 | Kreuzburg et al. | 210/632 |

FOREIGN PATENT DOCUMENTS

| | | | |
|---|---|---|---|
| 51-107661 | 9/1976 | Japan | 210/905 |
| 1017684 | 5/1983 | U.S.S.R. | 210/705 |

*Primary Examiner*—Peter Hruskoci
*Attorney, Agent, or Firm*—Klaas & Law

[57] ABSTRACT

Waste water from fat rendering and meat processing plants is treated in a conventional clarifier to produce better separation of suspended solids and fat from waste water by the addition of a first solution of pH controlling agent in combination with a surfactant and a second solution of a flocculating agent into the waste water streams entering the clarifier.

12 Claims, No Drawings

WASTE WATER TREATMENT

BACKGROUND OF THE INVENTION

This invention relates to the field of fat rendering and more particularly to methods and compositions for improving the separation of inedible fat from process water and solid waste.

Fat rendering facilities have conventionally employed several methods for separating water from inedible fats and solids in the processing of waste resulting from the rendering operation, after the removal of the melted edible fat. In currently employed processes the waste, after separation of edible fat, includes inedible fat, water, and solids. Most rendering facilities use some type of holding tank or clarifier. Some of these clarifiers, or holding cells, use skimmer technology to remove fat and solids from several waste water streams throughout a typical plant. All these waste streams are brought together into such a holding cell. These waste streams co-mingle in the holding cells and tend, after time to roughly separate into three distinct layers or phases. The top-most layer contains largely fat or grease, together with water and some free fatty acids and salts of free fatty acids. The middle, and by far the largest phase, is the water layer generated from the water used in the process. This layer will also contain most of the same materials found in the top layer in different proportions. Finally, solids or sludge represents the bottom layer.

There are two primary purposes of these holding cells. First, removal of the fat and inedible tallow which, after a sufficient period of time rises to the surface where it can be removed by skimming which can then be sold. Secondly, it is necessary to perform the separation efficiently in order to discharge the waste water at an acceptable level of purity. Normally, if the retention time of the holding cell is long enough, then the separation of these three phases is improved to an acceptable level. This can and has been accomplished by increasing the capacity of the holding cells. This has, in the past, been the most used method of increasing the retention time.

In most holding cells or clarifiers, the subsequently separated fat layer, water layer and sludge layer are characterized, individually, with respect to the respective disposition of each layer. For example, the quality of water (middle phase) is generally measured by its Biological Oxygen Demand (B.O.D.) and the Suspended Solids (S.S.) in the water. The measured B.O.D. values and S.S. values (usually expressed in weight per unit volume, i.e. mg/l) are used to determine the acceptability and cost of discharge. For most water discharges (river and sewer), the cost to discharge the effluent is, among other things, also dependent upon the quantity of water; however, this is essentially constant from day to day when the processing or rendering plant is operating. Other measurements and restrictions are used occasionally in determining the quality of water depending on the local municipalities such as temperature, chemical oxygen demand (C.O.D.), or ammonia content. Generally, if one lowers either the B.O.D. or S.S. of the water, then the charge for discharging the water would be reduced. It is not economically feasible at the present time for some industries, including fat rendering plants, to eliminate the B.O.D. and S.S. values in water completely.

The sludge in the bottom layer is usually pumped or augered out of the plant and taken to one of many large lagoons. These discharge lagoons are alternated in such a fashion that the solids can be air dried and disposed of in a land fill operation.

The skimmings obtained from the top layer are cooked and sold as inedible tallow. In continuous rendering systems, the tallow can be blended with other fat prior to cooking in a cooker. In a batch rendering operation it may be cooked and sold separately or blended with other fat.

The tallow obtained, i.e. flotation grease, from the holding cells is generally of poor quality and represents from 2 to 10 percent of the total inedible tallow for a typical beef packing operation. Although, this percentage is small; it influences the quality of the entire inedible tallow considerably if it is blended.

Color and the free fatty acid (FFA) content of the tallow from the skimmings are the two primary criteria used in determining the quality, and therefore, the value of the tallow. There are several other measurements that can be used but are less significant. Furthermore, color (F.A.C.) and F.F.A. content correlates to one another. A dark color generally means a high F.F.A. content. It is because of this relationship that the determination of the F.F.A. is used to evaluate the value of the skimming or total inedible tallow. Under normal operating conditions the F.F.A. of flotation grease can vary between 3 and 85 percent for most facilities, which when higher than about 4 percent is undesirable.

In addition the quality of the water discharged from the holding tanks generally contains sufficient soluble impurities and suspended solids to render direct discharge costly or impossible without further treatment.

OBJECT OF THE INVENTION

It is therefore an objective of the present invention to improve the yield of fat from clarifiers used in meat packing and rendering facilities while lowering the F.F.A. content of the flotation grease, its moisture content, and, to improve the color so that it can be blended or sold separately after cooking to produce a tallow with a higher economic value and lower capital cost than possible with conventional holding cell or clarifier systems.

It is also an objective of the present invention to provide compositions and methods for improving the quality of water separated from the sludge or solids and flotation grease whereby the B.O.D. values of the water and the suspended solids content are substantially reduced.

BRIEF SUMMARY OF THE INVENTION

The present invention achieves the hereinbefore stated objectives by the addition of two separate compositions, in aqueous solution to the waste water stream, preferably before the stream enters a clarifier-skimmer. The first composition is a combination of a composition containing a compound or mixture of compounds capable of producing a predetermined pH in a clarifier or holding tank, such composition being used in combination with surfactant. The second composition, in solution, is the flocculant, aluminum sulfate, alone or in combination with an enzyme such as a protease. These compositions are added to the waste water stream containing solids and inedible fat in amounts, described more fully hereinafter, which are effective to provide an increase in fat separated from the waste water which has improved color and lower FFA than clarifying processes operated without the addition of these compositions. The process of the present invention utilizing effective amounts of the described compositions also provides a reduction in the suspended solids, B.O.D. value, and fat in the separate water layer formed in the clarifier.

DETAILED DESCRIPTION OF THE INVENTION

The waste water effluent from a fat rendering facility normally contains a complex mixture of water, solids and inedible fat.

Further, the natural emulsifiers present in the mixture tend to both disperse the fat into the water phase and the water into the fat phase. This natural action of the materials present in the waste water stream severely complicates the separation of fat from the water, adversely effecting both the quality of the water and the quality of the fat.

There are several natural emulsifiers that can disperse fat into the water phase and visa versa. Low molecular weight proteins are always present and act as emulsifiers which contribute to the described undesirable dispersion of fat into water and water into the fat. The primary emulsifiers, because of the large quantity present, are the fatty acids and the salts of these fatty acids. Fatty acids are slightly soluble in water and much more soluble in fat. Whereas, the salts of these free fatty acids are generally soluble in water and less soluble in the fat phase. In this mixture the fat molecules are more associated with the fatty acid molecules, and the water molecules are more associated with the salts of the free fatty acids.

The emulsification of the waste water system is very dependent upon the pH of the waste stream. If the pH was very low (i.e. less than about 3.0) then the four component system would be reduced to three components. The salt of the free fatty acids would be replaced by free fatty acids. In this case, a pH less than about 3, the only emulsifier would be fatty acids. This condition leads to a high F.F.A. content in the flotation grease.

On the other end of the pH scale, i.e., pH's generally greater than about 10, the free fatty acids would be neutralized; thus resulting in an increase of salts of free fatty acids, called tallow soaps. This would leave, predominately, only these salts of free fatty acids as the emulsifiers for the fat-water system. This can then create too much foaming in the cookers as well as losses in the flotation grease due to hydrolysis.

In most facilities, the pH of the waste streams varies substantially depending on the type of waste water stream involved, but is generally acidic. However, in practice, the pH of the holding cells, or clarifiers, is generally about $7.0 \pm 1.5$ or near neutral because of the large buffering capacity of the cells. Thus, in the vast majority of the plants the true four component system is in operation.

As described the two emulsifiers described, i.e., fatty acid and the salts of fatty acids, have good transport properties for water molecules migrating into the fat and the fat molecules into the water. Both of these properties are undesirable. The water molecules in the fat could yield more free fatty acids in further processing particularly when enzymes are present. Lipases occur naturally in the fat tissue of animals and are generally present in the waste water recovered from the systems previously described. The presence of water is necessary to break-down the fat molecules into fatty acids and glycerine. Fat molecules in the water phase would yield higher B.O.D. and S.S. values of the water.

As previously mentioned, the fat molecules are more associated with the fatty acids. In fact, one can picture a fat molecule surrounded by fatty acid and/or derived salts of fat molecules in the water phase. The opposite of this is also true, the water molecules would be surrounded by the salts of fatty acids and/or fatty acid molecules in the fat phase. Therefore, according to the objectives and teachings of the present invention it is considered important to break-up these associations in order to provide for better separation. A better tallow would result and the quality of water would be improved.

Treatment of the waste water according to the present invention can be a two step process or a single step process that involves many chemical reactions in order to break-up the association promoted by the emulsifiers between fat and water. First, the use of an effective amount of a surfactant is necessary to penetrate the association. Once the fatty acid is freed by the surfactant, it is essential to provide for the presence of a composition in sufficient amounts to be capable of producing in a clarifier, and maintaining during clarifications, a pH of from between about 6.0 to about 6.5 in order to produce free fatty acid salts. This is illustrated by the following, representative chemical reaction:

$$\text{Fatty Acid (FA)} + \text{NaOH} \xrightarrow{\text{Surfactant}} \text{H}_2\text{O} + \text{Salt of the free fatty acid (NaFA)}$$

Next, according to the present invention, it is necessary to react the sodium salt of the free fatty acid (NaFA) with aluminum ion which is represented as follows:

$$3\,\text{NaFA} + \text{Al}^{+3} \rightarrow 3\text{Na} + \text{Al(FA)}_3$$

The aluminum fatty acid salt that is formed in the water phase floats to the top of the typical waste water holding cell treated with the composition of the present invention. Aluminum salts of free fatty acids are greases and are soluble in the fat. Furthermore, there is no water associated with this salt unlike the sodium salt or the free fatty acid itself. This mechanism reduces the water content of the fat and also the fat content of the water.

A secondary function for the aluminum ion addition is the formation of a precipitating flocculant that traps suspended solids and other impurities in the water system.

Optionally, by adding an enzyme to the system that consumes proteins, one can break the protein induced emulsification of fat into the water phase and water into fat layer. Incorporation into the chemical addition of such an enzyme further assists the de-emulsification process. This enzyme addition also aids in destroying the lipase that produces fatty acids and glycerine from fat.

The pH controlling agent and surfactant composition of the present invention comprises an aqueous solution containing a composition comprising a compound or mixture of compounds in sufficient amounts to be capable of producing the desired pH in a clarifier, and in combination with from about 0.1% to about 5% by weight of a surfactant. The composition used in the present invention can be selected from the group consisting of sodium hydroxide, potassium hydroxide, lithium hydroxide, magnesium hydroxide, calcium hydroxide, sodium carbonate, potassium carbonate, lithium carbonate, sodium metasilicate, potassium silicate, sodium phosphates, potassium phosphates, ammonium hydroxide, and any mixtures thereof which will produce the described pH. The pH controlling composition of the present invention is preferrably used in the first solution in amounts equivalent to 20% to 50% by weight of sodium hydroxide in the solution.

The most preferred combination of pH controlling composition in the first solution is a combination of sodium and potassium hydroxide which provides an equivalent alkalinity in said first solution of about 35% by weight (expressed as NaOH) and can reduce the freezing point of the solution sufficiently to enable the use of the composition in waste water clarifiers which are open to a cold winter environment. This product produces the advantages described when used in packing plants in amounts of from about 3.5 to 70 parts per million (ppm) of the waste water. Preferably, the pH controlling-surfactant composition is utilized in amounts of from about 10 to about 30 ppm and most preferably in amounts of from about 15 to 20 ppm.

Where the invention is practiced in a rendering facility, the pH controlling-surfactant composition can be used in amounts of from about 7 to about 175 ppm, and more preferably in amounts of from about 30 to about 70 ppm and most preferably in amounts of from about 45 ppm to about 55 ppm.

The surfactant selected is preferably a non-ionic alkyl glucoside such as Triton BG-10 supplied by Rohm & Haas Co. of Philadelphia. Other surfactants capable of functioning as described, such as aliphatic organic phosphate esters and salts of dicarboxyethyl fatty acid derived imidazoline can also be employed. Such materials are readily obtainable and other surfactants can be employed without undue experimentation to determine the effective amounts in the systems described.

The aluminum sulfate second solution is used in packing plants in amounts of from about 5 to about 30 ppm and more preferably 10 to 20 ppm. In rendering facilities, the aluminum sulfate solution can be used in amounts of from about 10 to 100 ppm, and preferably in amounts of from about 20 to about 60 ppm and most preferably in amounts of from about 30 to about 40 ppm.

The aluminum sulfate solution can also advantageously contain a minor amount of a protease. In the embodiments described, Neutrase 1.5T enzyme obtained from Novo Laboratories, Inc. of Wilton, Conn. was used.

The following Example and Tables describe how the present invention can be used effectively in processing and rendering plants.

EXAMPLE 1

The present invention has utility for improving the function of clarifiers used for separating fat and suspended solids. Typically, clarifiers are used in rendering plants and meat packing plants. In this example, the compositions and methods of the present invention were used in a beef packing facility processing about 3000 head of fat cattle in an eight hour day. This plant uses between about 1.6 million and 1.8 million gallons of water per day, and produces up to about 250,000 pounds of inedible tallow per day. The waste water treatment portion of this facility employs three clarifiers to remove the fat and sludge from the combined waste water streams. In this particular plant, two of the clarifiers are in parallel to each other and are used as secondary clarifiers for the lower fat content water effluent from the primary clarifier. The function of the primary clarifier is to permit separation of solids and fat from the combined waste water stream and to skim about 95% of the waste fat from the waste water. All of the waste water from processing stations throughout the plant are pumped into the primary clarifier and then after primary separation of the fat and solids from the water, the water is then pumped to the secondary clarifiers for further removal of fat from the water. The skimmed fat from the primary and secondary clarifiers is then mixed with the other inedible tallow obtained from processing before cooking or to processed tallow after cooking.

The inedible tallows obtained from the skimmings are generally between 5% to 10% by weight of the total tallow production and is generally of poor quality having an FFA number greater than 17. This fat, when mixed with the other process derived fat tends to lower the overall quality of the final tallow product.

During the processing described, an aqueous solution of pH controlling composition and surfactant (composition No. 7 in Table II) was added to the waste water entering the primary clarifier at a rate of 30 gallons in a twenty four hour period. At the same time a second aqueous solution of an aluminum sulfate flocculant was introduced into the waste water. In an eight hour period, typically about 200 pounds of the aluminum sulfate, dissolved in 110 gallons of water was used. Preferably the aqueous second solution containing the flocculant, was introduced into a waste water surge tank or pit prior to the waste water being pumped into the primary clarifier. This co-administration of the two solutions, containing the compositions of the present invention, in aqueous solutions, produced the following results in Table I:

TABLE I

|  | Control | Treatment |
|---|---|---|
| Kill/8 hour day | 3,000 | 3,000 |
| Inedible Tallow lbs/day | 250,000 | 258,000 |
| FFA in processed tallow | 2.8% | 1.5% |
| FFA in skimmings | 17% | about 2% |
| BOD Waste Water |  | 30% less than control |
| SS in Waste Water |  | 30% less than control |

The results described in the example are representative of the kinds of results that can be obtained in an increase in the fat obtained in the fat layer and a reduction of free fatty acids in the fat layer, the reduction in B.O.D. and suspended solids in the exit water from the clarifier.

Typical compositions useful in the process of the present invention are shown in Tables II and III: The line numbers in each table represent the same example for purposes of comparison between results obtained.

TABLE II

| Aqueous Solutions of Caustic and Surfactant | | |
|---|---|---|
| Caustic Part | Surfactant** | Equivalent Alkalinity* |
| (1) 50% NaOH | 5% T-10 | 50% |
| (2) 50% NaOH | 5% T-10 | 50% |
| (3) 50% NaOH | 0.5% T-10 | 50% |
| (4) 50% NaOH | 0.5% T-10 | 50% |

TABLE II-continued

Aqueous Solutions of Caustic and Surfactant

| Caustic Part | Surfactant** | Equivalent Alkalinity* |
|---|---|---|
| (5) 40% NaOH | 3% T-10 | 40% |
| (6) 40% NaOH | 0.3% T-10 | 40% |
| (7) 35% NaOH | 0.2% T-10 | 35% |
| (8) 35% NaOH | 5% T-10 | 35% |
| (9) 45% KOH | 0.2% T-10 | 32.1% |
| (10) 45% KOH | 2.0% T-10 | 32.1% |
| (11) 45% KOH | 0.5% B-H | 32.1% |
| (12) 45% KOH | 2.0% B-H | 32.1% |
| (13) 28.5% NaOH 9% KOH | 0.3% T-10 | 34.9% |
| (14) 28.5% NaOH 9% KOH | 3% T-10 | 34.9% |
| (15) 28.5% NaOH 9% KOH | 0.2% T-10 | 34.9% |
| (16) 28.5% NaOH 9% KOH | 2% T-10 | 34.9% |
| (17) 18.5% NaOH 23% KOH | 0.2% T-10 | 34.9% |
| (18) 18.5% NaOH 23% KOH | 2% T-10 | 34.9% |
| (19) 30% NaOH | 0.3% B-H | 30% |
| (20) 25% NaOH | 0.3% B-H | 25% |
| (21) 25% NaOH | 1.0% CEM | 25% |
| (22) 25% NaOH | 1.0% CEM | 25% |
| (23) 25% NaOH | 0.2% Bi | 25% |
| (24) 25% NaOH | 0.2% Bi | 25% |
| (25) 30% KOH | 0.2% T-10 | 21.4% |
| (26) 30% KOH | 0.2% Bi | 21.4% |
| (27) 30% KOH | 0.2% CEM | 21.4% |
| (28) 30% KOH | 0.2% B-H | 21.4% |
| (29) 30% KOH | 2.0% T-10 | 21.4% |
| (30) 30% KOH | 2.0% Bi | 21.4% |
| (31) 30% KOH | 2.0% BH | 21.4% |
| (32) 30% KOH | 2.0% CEM | 21.4% |
| (33) 20% NaOH | 0.2% Bi | 20% |
| (34) 20% NaOH | 2% Bi | 20% |
| (35) 20% NaOH | 0.2% BH | 20% |
| (36) 20% NaOH | 2% BH | 20% |
| (37) 20% NaOH | 0.2% CEM | 20% |
| (38) 20% NaOH | 2% CEM | 20% |
| (39) 20% NaOH | 0.2% T-10 | 20% |
| (40) 20% NaOH | 2% T-10 | 20% |

*Based on sodium hydroxide (100%)
**T-10: Triton BG-10
CEM: Monateric CEM 38
BH: GAFAC-650
Bi: GAFAC BI-750 or BI-729 phosphate esters

TABLE III

Product B Powder Mixture

| Hydrated Aluminum Sulfate | Enzyme* |
|---|---|
| (1) 99.95% | 0.05% N-1.5 |
| (2) 99.5% | 0.5% N-1.5 |
| (3) 99.95% | 0.05% N-1.5 |
| (4) 99.5% | 0.5% N-1.5 |
| (5) 99.9% | 0.1% N-1.5 |
| (6) 99.5% | 0.5% N-1.5 |
| (7) 99.9% | 0.1% N-1.5 |
| (8) 99% | 1.0% N-1.5 |
| (9) 99.9% | 0.1% N-1.5 |
| (10) 99.5% | 0.5% N-1.5 |
| (11) 99.5% | 0.5% N-1.5 |
| (12) 99.9% | 0.1% N-1.5 |
| (13) 99.9% | 0.1% N-1.5 |
| (14) 99.9% | 0.1% N-1.5 |
| (15) 99.4% | 0.6% N-1.5 |
| (16) 99.4% | 0.6% N-1.5 |
| (17) 99.9% | 0.1% N-1.5 |
| (18) 99.4% | 0.6% N-1.5 |
| (19) 99.0% | 1.0% N-1.5 |
| (20) 99.4% | 0.6% N-1.5 |
| (21) 99.95% | 0.05% N-1.5 |
| (22) 99.4% | 0.6% N-1.5 |
| (23) 99.95% | 0.05% N-1.5 |
| (24) 99.4% | 0.6% N-1.5 |
| (25) 99.4% | 0.6% N-1.5 |
| (26) 99.4% | 0.6% N-1.5 |
| (27) 99.4% | 0.6% N-1.5 |
| (28) 99.4% | 0.6% N-1.5 |
| (29) 99.4% | 0.6% N-1.5 |
| (30) 99.4% | 0.6% N-1.5 |
| (31) 99.4% | 0.6% N-1.5 |
| (32) 99.4% | 0.6% N-1.5 |
| (33) 99.4% | 0.6% N-1.5 |
| (34) 99.4% | 0.6% N-1.5 |
| (35) 99.95% | 0.05% N-1.5 |
| (36) 99.95% | 0.05% N-1.5 |
| (37) 99.4% | 0.6% N-1.5 |
| (38) 99.4% | 0.6% N-1.5 |
| (39) 99.95% | 0.05% N-1.5 |
| (40) 99.95% | 0.05% N-1.5 |

*Neutrase 1.5T
Product of NOVO Laboratories, Inc.

The foregoing description of the compositions and processes of the present invention are exemplary only and the scope of the present invention is limited to the claims as interpreted in view of the prior art. Equivalent methods and compositions may be employed, as described, to provide the objectives and advantages described herein.

What is claimed is:

1. A process for facilitating the separation of fat from a waste stream composition comprising water, fat, fatty aids, and solids produced in food processed plants and rendering plants, said process comprising the steps of:
   (a) adding an aqueous flocculant composition comprsing an aluminum salt the waste stream composition in an amount to maintain from about 5 ppm to about 100 ppm of the aluminum salt in the waste stream composition prior to subsequent addition of an aqueous alkaline pH control composition to said waste stream;
   (b) subsequently adding the aqueous alkaline pH control composition to the resulting waste stream composition of (a), said pH control composition comprising an alkali metal hydroxide in a sufficient amount to produce an equivalent alkalinity thereto of from about 20% to about 50% by weight of sodium hydroxide to produce a pH of from about 6.0 to about 6.5 in the resulting waste stream composition, and further comprising a surfactant in an amount of from about 0.1% to about 5.0% by weight of the pH control composition; and
   (c) subsequently holding the resulting waste stream composition of (b) in a clarifier for a period of time sufficient for formation of an aluminum hydroxide fatty acid complex which floats to thereby effect separation of the waste stream composition into three layers, the bottom layer thereof comprising essentially solids, the middle layer thereof comprising essentially water, and the top layer thereof comprising essentially fat which can be recovered by skimming for further processing.

2. The process of claim 1 wherein the pH control composition is continuously added to the waste stream composition at a sufficient rate to maintain from about 3.5 parts per million to about 175 parts per million thereof in the clarifier.

3. The process of claim 2 wherein the pH control composition is continuously added to the waste stram composition at a sufficient rate to maintain from about 3.5 parts per million to about 70 parts per million thereof in the clarifier.

4. The process of claim 3 wherein the pH control composition is continuously added to the waste stream composition at a sufficient rate to maintain from about 10 parts per million to about 30 parts per million thereof in the clarifier.

5. The process of claim 4 wherein the pH control composition is continuously added to the waste stream composition at a sufficient rate to maintain from about 15 parts per million to about 20 parts per million thereof in the clarifier.

6. The process of claim 1 and wherein the flocculant composition contains a protease in an amount of from about 0.05% to about 1.0% by weight of the flocculant composition.

7. The process of claim 6 wherein the pH control composition is continuously added to the waste stram composition at a sufficient rate to maintain from about 3.5 parts per million to about 70 parts per million thereof in the clarifier.

8. The process of claim 1 wherein the aluminum salt of the flocculant composition is aluminum sulfate.

9. The process of claim 8 wherein the flocculant composition is continuously added to the waste stream composition at a rate sufficient to maintain a concentration of aluminum sulfate in the calrifier of from about 5 parts per million to about 100 parts per million.

10. The process of claim 9 wherein the flocculant composition is continuously added to the waste stream composition at a rate sufficient to maintain a concentration of aluminum sulfate in the clarifier of from aobut 5 parts per million to about 30 parts per million.

11. The process of claim 10 wherein the flocculant composition is continuously added to the waste stream composition at a rate sufficient to maintain a concentration of aluminum sulfate in the clarifier of from about 10 parts per million to about 20 parts per million.

12. The process of claim 1 wherein the akali metal hydroxide is chosen from the group consisting of sodium hydroxide, potassium hydroxide and mixtures thereof.

* * * * *